Oct. 16, 1923.

A. J. PERKINS

SHOCK ABSORBER

Filed May 4, 1921

Inventor
Alfred J. Perkins
By J. W. M. Ellis
Attorney

Oct. 16, 1923.
A. J. PERKINS
SHOCK ABSORBER
Filed May 4, 1921
1,470,931
2 Sheets-Sheet 2
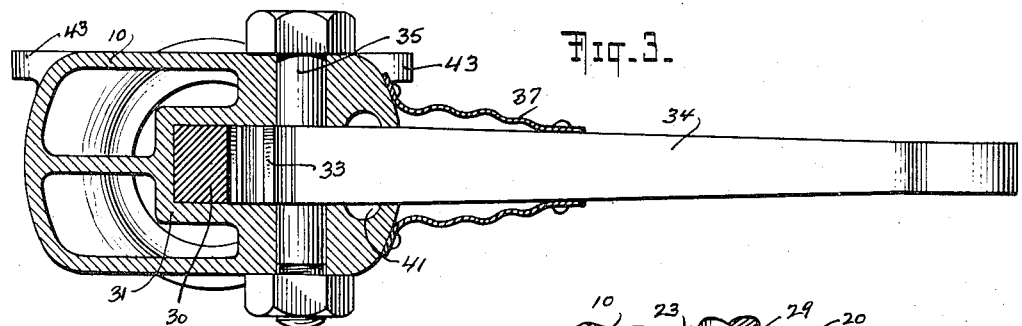
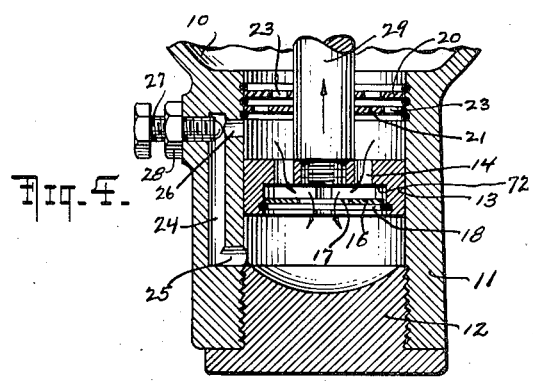
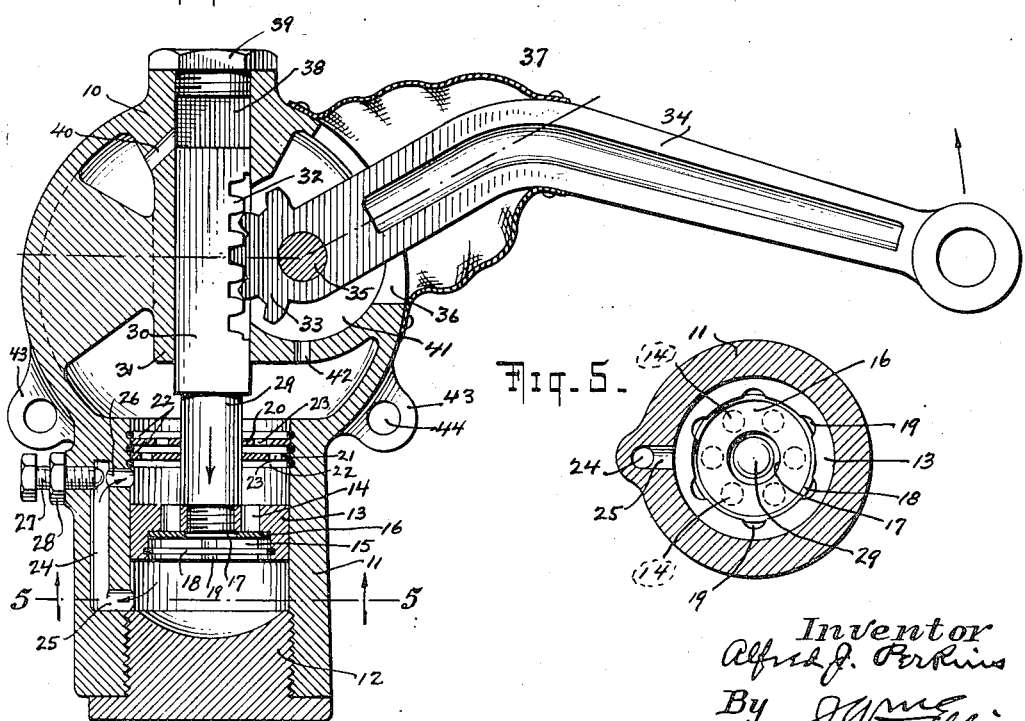
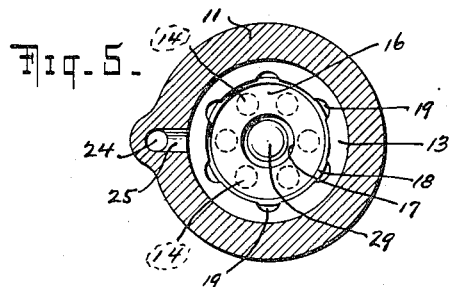
Inventor
Alfred J. Perkins
By J.W. Ellis
Attorney Patented Oct. 16, 1923.

1,470,931

UNITED STATES PATENT OFFICE.

ALFRED J. PERKINS, OF HAMBURG, NEW YORK.

SHOCK ABSORBER.

Application filed May 4, 1921. Serial No. 466,834.

*To all whom it may concern:*

Be it known that I, ALFRED J. PERKINS, a citizen of the United States of America, and a resident of the village of Hamburg, Erie County, and State of New York, have invented certain new and useful Improvements in Shock Absorbers, of which the following is a full, clear, and exact description.

My device relates in general to shock absorbers and more particularly to hydraulic shock absorbers.

The principal object of my invention has been to provide an efficient device of this nature which shall permit unrestrained action of the parts in one direction and shall offer a regulatable resistance against movement in the opposite direction.

Other objects are to provide a device which shall be compact in design; one simple and cheap to manufacture; and one with comparatively few parts, whereby the device shall not easily get out of working order.

A further object of my invention has been to provide a device, all parts of which shall be efficiently sealed against leakage of the fluid.

Moreover, my device is provided with convenient means on the exterior for adjusting the amount of resistance offered to the moving parts, whereby it may be easily and quickly adjusted to different requirements.

Furthermore, my device is of such a design that the movement of the parts to which the device is attached with respect to the moving parts of the device is divided.

The above objects and advantages have been accomplished by the device shown in the accompanying drawings, of which:

Fig. 2 is a longitudinal, sectional view of my device, taken on the center-line thereof.

Fig. 3 is a sectional, plan view taken on line 3—3 of Fig. 2.

Fig. 4 is a similar fragmentary, sectional view, showing some of the parts in different positions from those shown in Fig. 2.

Fig. 5 is a sectional view taken on line 5—5 of Fig. 2.

Figure 1:
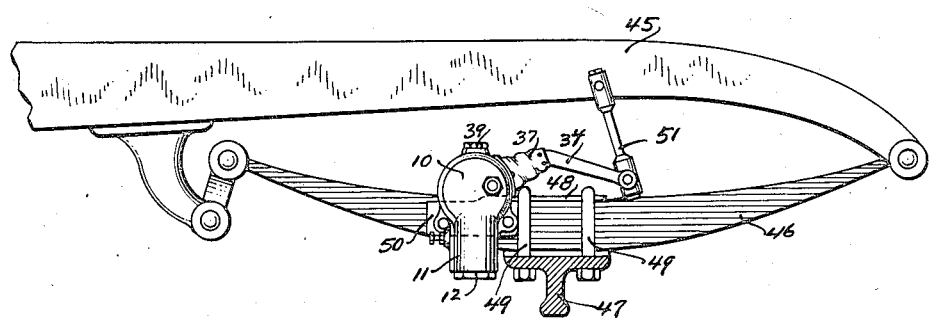
Fig. 1 is a fragmentary, side elevation of an automobile chassis, showing my device attached thereto.

I will first describe the form of invention shown in Figs. 2 to 5. In this form, my invention comprises a casing 10 having a depending cylinder 11, made preferably an integral part thereof. 12 is a cylinder plug which is preferably screw-threaded into the lower end of the cylinder 11, whereby this end is closed. Mounted within the cylinder 11 is a piston 13 which is provided with a plurality of apertures 14 formed through its head. A recess 15 is provided in the lower side of the piston, thus forming a shoulder 72. A metallic disc 16 is mounted in this recess and forms a valve for closing the apertures 14 in the piston head. A central aperture 17 is formed in the disc 16, for purposes to be hereinafter described. A retaining ring 18 is disposed within an annular groove formed in the recess 15 and arranged some distance below its upper end. This retaining ring prevents the disc 16 from falling out of the recess 15, and maintains it in such a position that, when the piston is moving downwardly, the disc will be moved upwardly to close the apertures 14. A plurality of axial grooves 19 are arranged in the periphery of the recess 15, which with the aperture 17, form outlets for the fluid when the piston is moved upwardly.

Arranged above the piston 14 is a plurality of baffle discs 20 and 21. These discs are held in interspaced relation by means of rings 22, which are sprung into grooves formed in the upper end of the cylinder. Each of the discs 20 and 21 is provided with a plurality of apertures 23. The apertures in the disc 20 are arranged in staggered relation with the apertures in the disc 21. This permits the fluid to pass upwardly out of the cylinder, but prevents its being thrown up into the casing by a quick upward movement of the piston.

The cylinder 11 is provided with a vertically arranged fluid by-pass 24, which is connected at its lower end to the interior of the cylinder by means of a port 25 and at its upper end to the interior of the cylinder by a port 26. The port 26 is arranged at such a point that it will be exposed when the piston is in its maximum upward position. Arranged opposite the port 26 is a regulating screw 27. The inner end of this screw is preferably spherical in shape, and the effective area of the opening in the port 26 may be conveniently regulated by a movement of this screw. A lock nut 28 serves to retain the screw in its adjusted position.

A piston rod 29 is secured at its lower end to the piston 14 and passes up into the casing 10. The upper portion 30 of the rod is preferably square-shape in cross-section, as shown in Fig. 3, and this portion of the rod is slidably mounted in a suitable bearing 31. The portion 30 of the rod is provided at one side with a gear rack 32. A gear segment 33 is formed on the inner end of an operating arm 34. The operating arm is pivotally united to the casing 10 by means of a pivot bolt 35. The gear segment 33 is in engagement with the gear rack 32. The inner end of the operating arm 34 passes through a slot 36 formed in the casing 10, and a sleeve 37 of flexible material is preferably provided over the slot 36 whereby all dust and dirt will be prevented from coming into contact with the working parts of the device. Arranged in the upper end of the opening 38, formed by the bearing 31, is a plug 39. This plug serves to close the opening against any dust or dirt. When the plug is removed, a filler opening is provided, through which the fluid may be initially placed or replenished. A hole 40 is preferably provided through the bearing 31, and serves to connect the opening 38 with the interior of the casing 10. The gear segment 33 is mounted within a recess 41, and an aperture 42 is provided at the bottom of the recess, whereby all fluid which finds its way to the recess will be drained back into the casing.

The casing is provided with two lugs 43, each having an aperture 44, whereby the device may be secured in position.

The device may be attached in any one of a number of ways, but I prefer the method shown in Fig. 1. In this figure, 45 represents the frame; 46 the spring; and 47 the axle of the chassis to which the device is shown attached. As shown here, I preferably provide an angle plate 48 having its horizontally arranged leg secured under the spring clips 49, the vertical leg of the angle being cut away so as to clear the clips. To the rearwardly extending vertical leg 50 of the angle iron, I secure the casing of my device. The outer end of the operating arm 34 is connected preferably by a ball and socket joint to the lower end of a link 51. The upper end of the link is likewise connected by means of a ball and socket joint to the frame 45. If desired the angle iron may be arranged beneath the spring or the device may be attached in any suitable way directly to the axle 47.

Figure 6:
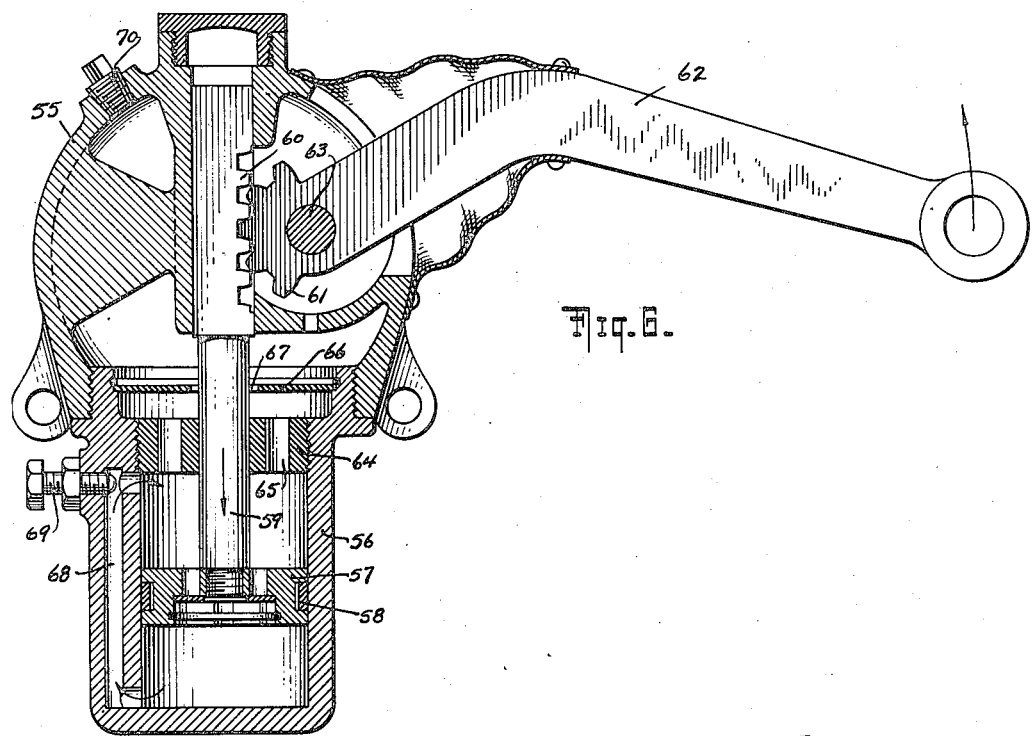
Fig. 6 is a longitudinal, sectional elevation of a modified form of my device.

In the form of the device shown in Fig. 6, the casing 55 is provided in its lower portion with a screw-threaded aperture, in which the cylinder 56 is screwed. In this form the piston 57 is similar to that already described, and shows the use of a piston ring 58 for sealing the piston. 59 is the piston rod which is provided at its upper end with a gear rack 60 engageable with a gear segment 61, carried at the inner end of the operating arm 62. 63 is the pivot pin. 64 is a piston rod guide, which is arranged in the upper end of the cylinder and is provided with a plurality of apertures 65, through which the fluid may pass without restriction. A baffle plate 66 is arranged in the upper end of the cylinder. This plate is disposed some distance above the apertures in the piston rod guide 64, and it is provided with a central aperture 67. This baffle disc 66 prevents the fluid from being thrown upwardly from the apertures 65. 68 is the fluid by-pass; and 69 is the adjusting screw. A filler opening is provided for the casing 55, which is preferably closed by means of a plug 70.

Since the operation of both forms of my invention is identical, I will describe the operation of only that form shown in Figs. 2 to 5, inclusive. Before the device is to be put into use, the cylinder is filled with fluid, preferably glycerine, through the opening 38. When so filled the cap 39 is placed in position and the device is ready for use.

It will be seen that when the operating arm 34 and the piston are moving in the direction of the arrows shown in Fig. 2, the disc 16 will be held tightly against the shoulder 72 by the fluid and the apertures 14 will be sealed, so that the piston will act to force the fluid out of the lower end of the cylinder. The fluid thus placed under pressure, will pass through port 25, fluid by-pass 24, through the port 26. The screw 27 having been previously adjusted, the flow of the material through the opening 26 will be restricted, and the pressure produced in the lower end of the cylinder may be thus regulated for different conditions. From the port 26 the fluid will, of course, flow on top of the piston 14. When the piston is reversed in direction and moved as indicated by the arrow in Fig. 4, the disc 16 will move downwardly and rest upon the ring 18, thus uncovering the openings 14, and allowing the fluid to pass through said openings from the upper end of the cylinder to the lower end thereof without restriction. Whenever the piston is reversed in direction the disc is quickly forced upwardly and seated so as to close the apertures 14 and the device will then operate under the pressure conditions just above described and will prevent the rebound of the springs of the chassis to which the devices are attached.

Obviously, some modifications of the details herein shown and described may be made without departing from the spirit of my invention or the scope of the appended claims; and, I do not, therefore, wish to be limited to the exact embodiment herein shown and described, the form described being merely a preferred embodiment thereof.

Having thus described my invention what I claim is:

1. A shock absorber characterized by having a cylinder, a piston slidably mounted in the cylinder and formed with valved openings therethrough, the cylinder being provided with a fluid by-pass, means for regulating the openings in the by-pass, and rack and pinion means for actuating the piston.

2. A shock absorber characterized by having a casing, a cylinder carried by the casing, a piston slidably mounted in the cylinder, and formed with valved openings therethrough, a piston rod slidably mounted in the casing, the cylinder being provided with a fluid by-pass, means for regulating the opening in the by-pass, a gear rack formed on the piston rod, an operating arm pivotally mounted in the casing, and a gear segment actuated by the operating arm and engageable with the rack.

3. A shock absorber characterized by having a cylinder, a piston slidably mounted in the cylinder and formed with openings through its head, a disc carried by the piston for closing the openings thereof, the cylinder being formed with a fluid by-pass, means for regulating the opening in the by-pass, and rack and pinion means for actuating the piston.

4. A shock absorber characterized by having a cylinder, a piston slidably mounted in the cylinder, the piston being formed with openings through its head and a recess in its bottom, an apertured disc mounted for limited motion in the recess, the recess being provided with outlet grooves in its periphery, the cylinder being formed with a fluid by-pass, means for regulating the opening in the by-pass, and rack and pinion means for actuating the piston.

5. A shock absorber characterized by having a cylinder, a piston slidably mounted in the cylinder and formed with valved openings therethrough, baffle plates arranged above the piston, the cylinder being provided with a fluid by-pass, means for regulating the opening in the by-pass, and rack and pinion means for actuating the piston.

6. A shock absorber characterized by having a casing, a cylinder carried by the casing, a piston slidably mounted in the cylinder, and formed with valved openings therethrough, a piston rod slidably mounted in the casing, baffle plates arranged above the piston, the cylinder being provided with a fluid by-pass, means for regulating the opening in the by-pass, a gear rack formed on the piston rod, an operating arm pivotally mounted in the casing, and a gear segment actuated by the operating arm and engageable with the rack.

7. A shock absorber characterized by having a casing, a cylinder carried by the casing, a piston slidably mounted in the cylinder and formed with openings through its head, a disc carried by the piston for closing the opening thereof, a piston rod slidably mounted in the casing, a gear rack formed on the piston rod, an operating arm pivotally mounted in the casing, and a gear segment actuated by the operating arm and engageable with the rack.

8. A shock absorber characterized by having a cylinder, a piston slidably mounted in the cylinder, baffle plates arranged above the piston, the cylinder being provided with a fluid by-pass, means for regulating the opening in the by-pass, and rack and pinion means for actuating the piston.

9. A shock absorber characterized by having a cylinder, a piston slidably mounted in the cylinder and formed with valved openings therethrough, baffle plates arranged above the piston, the cylinder being provided with a fluid by-pass, means for regulating the opening in the by-pass, and means for actuating the piston.

In testimony whereof, I have hereunto signed my name.

ALFRED J. PERKINS.